(12) United States Patent
Masakiyo et al.

(10) Patent No.: US 12,103,477 B2
(45) Date of Patent: Oct. 1, 2024

(54) STEERING APPARATUS

(71) Applicant: Yazaki Corporation, Tokyo (JP)

(72) Inventors: Hiroki Masakiyo, Hiroshima (JP); Satoshi Hashimoto, Hiroshima (JP); Tsutomu Kimura, Hiroshima (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/497,388

(22) Filed: Oct. 30, 2023

(65) Prior Publication Data

US 2024/0059233 A1 Feb. 22, 2024

Related U.S. Application Data

(63) Continuation of application No. PCT/JP2022/042753, filed on Nov. 17, 2022.

(30) Foreign Application Priority Data

Dec. 1, 2021 (JP) ................. 2021-195531

(51) Int. Cl.
- *B60R 16/02* (2006.01)
- *B60R 13/02* (2006.01)
- *B60R 16/027* (2006.01)
- *B62D 1/185* (2006.01)

(52) U.S. Cl.
CPC ...... *B60R 16/0215* (2013.01); *B60R 13/0275* (2013.01); *B60R 16/027* (2013.01); *B62D 1/185* (2013.01)

(58) Field of Classification Search
CPC ............ B60R 16/0215; B60R 13/0275; B60R 16/027; B62D 1/185

USPC ................................ 74/492, 493
See application file for complete search history.

(56) References Cited

U.S. PATENT DOCUMENTS

| | | | | |
|---|---|---|---|---|
| 5,647,753 | A * | 7/1997 | Ishikawa | B60R 16/027 439/15 |
| 6,471,529 | B2 * | 10/2002 | Oishi | B60R 16/027 439/164 |
| 7,344,156 | B2 * | 3/2008 | Suzuki | B60R 16/0215 174/72 A |
| 9,882,329 | B2 * | 1/2018 | Legoubin | F16L 23/024 |
| 11,667,322 | B2 * | 6/2023 | Wilson-Jones | B62D 1/184 74/493 |
| 2002/0125061 | A1 * | 9/2002 | Kawamura | H01F 38/18 280/775 |
| 2004/0145167 | A1 * | 7/2004 | Suzuki | B60R 16/0215 280/775 |

(Continued)

FOREIGN PATENT DOCUMENTS

JP 2020-131794 A 8/2020

*Primary Examiner* — Toan C To
(74) *Attorney, Agent, or Firm* — Sughrue Mion, PLLC

(57) ABSTRACT

A steering apparatus includes: a steering shaft coupled to a center of a steering wheel and movable in a front-rear direction of a vehicle; a steering shaft cover covering the steering shaft and allowing the steering shaft to be movable therein; and a protector attached to the steering shaft cover and allowing a part of a wire harness to be inserted and accommodated therein, the wire harness being a plurality of electric wires bundled and routed along the steering shaft. The wire harness positioned in the protector is routed in a state where the plurality of electric wires are unbundled and scattered.

5 Claims, 5 Drawing Sheets

(56) References Cited

U.S. PATENT DOCUMENTS

2013/0000953 A1\* 1/2013 Park ................. H01R 35/00
                                                    174/135
2016/0211633 A1\* 7/2016 Legoubin ............... B64D 37/08
2023/0234631 A1\* 7/2023 Hirano ................ B60R 16/0215

\* cited by examiner

STEERING APPARATUS

CROSS-REFERENCE TO RELATED APPLICATIONS

The present application is a continuation of International Application No. PCT/JP2022/042753, filed on Nov. 17, 2022, and based upon and claims the benefit of priority from Japanese Patent Application No. 2021-195531, filed on Dec. 1, 2021, the entire contents of which are incorporated herein by reference.

TECHNICAL FIELD

The disclosure relates to a steering apparatus including a protector for a wire harness.

BACKGROUND

Japanese Unexamined Patent Application Publication No. 2020-131794 proposes a protector used in a steering apparatus. The protector includes a passage through which a wire harness for the steering apparatus passes and holds the wire harness to be bent in an S shape in the passage. The protector has contact points as holding surfaces that are in contact with the wire harness and hold a state where the wire harness is bent in the S-shape in a state where the steering wheel is located at a movable limit position on a rear side of a vehicle, on respective inner surfaces of a side wall of the protector which constitutes the passage.

SUMMARY OF THE INVENTION

In the protector described above, when the steering wheel is located at the movable limit position on a front side of the vehicle, the wire harness is configured of a plurality of electric wires in which the wire harness is bundled, so that a larger force for curving the wire harness is required. Therefore, when the steering wheel is moved toward the movable limit position on the front side of the vehicle, the moving operability of the steering wheel deteriorates. Hence, in the steering apparatus, there is room for improving the moving operability of the steering wheel.

The disclosure is directed to a steering apparatus capable of improving the moving operability of a steering wheel when the steering wheel is moved toward a movable limit position on a front side of a vehicle.

A steering apparatus in accordance with the disclosure includes: a steering shaft coupled to a center of a steering wheel and movable in a front-rear direction of a vehicle; a steering shaft cover covering the steering shaft and allowing the steering shaft to be movable therein; and a protector attached to the steering shaft cover and allowing a part of a wire harness to be inserted and accommodated therein, the wire harness being a plurality of electric wires bundled and routed along the steering shaft. The wire harness positioned in the protector is routed in a state where the plurality of electric wires are unbundled and scattered.

According to the above-described configurations, it is possible to improve the moving operability of the steering wheel when the steering wheel is moved toward the movable limit position on the vehicle front side in the steering apparatus.

DETAILED DESCRIPTION OF THE INVENTION

Hereinafter, a steering apparatus according to an embodiment of the present invention will be described in detail with reference to the drawings.

Figure 1:
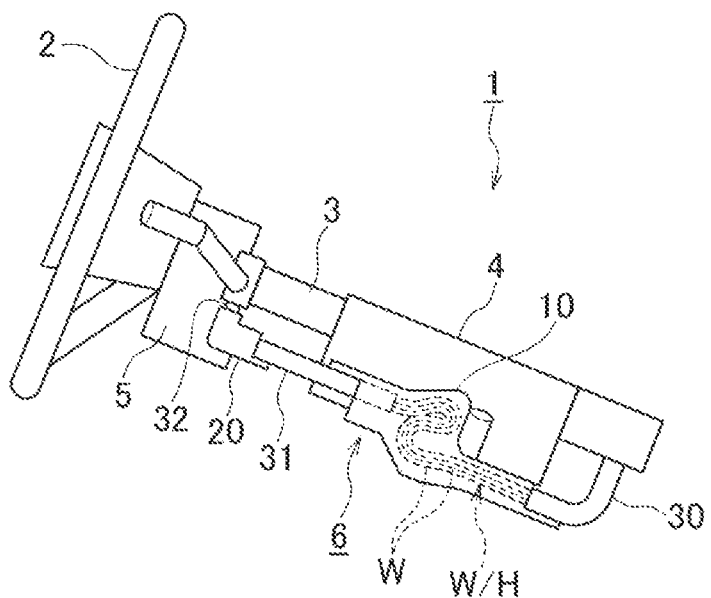
FIG. 1 is a side view illustrating an example of a steering apparatus according to an embodiment.
Figure 2:
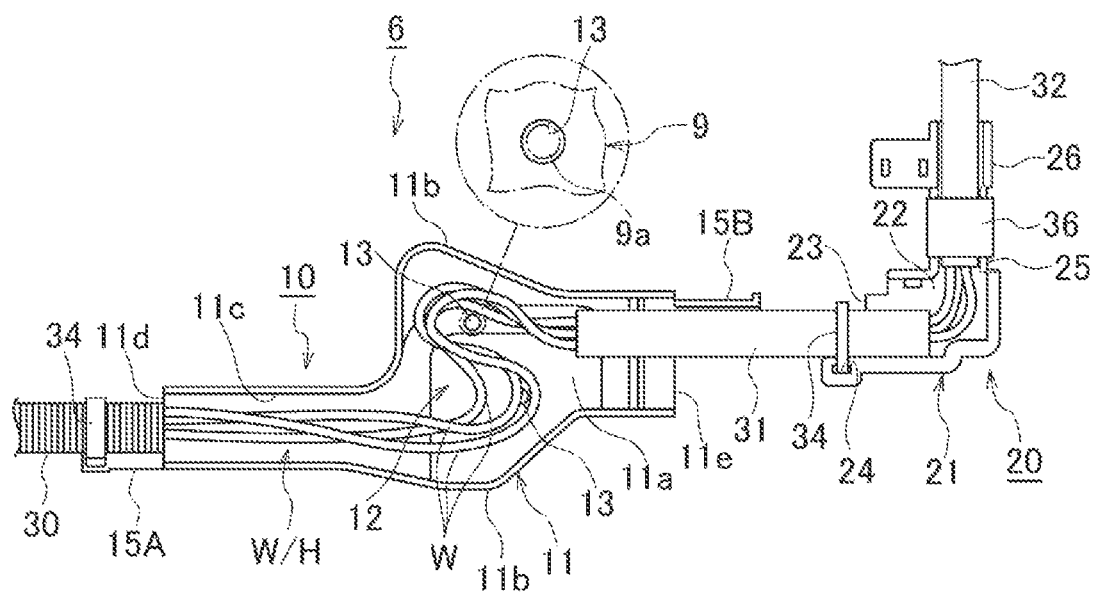
FIG. 2 is a plan view illustrating an accommodation mode of a wire harness in a protector used in the steering apparatus.
Figure 3:
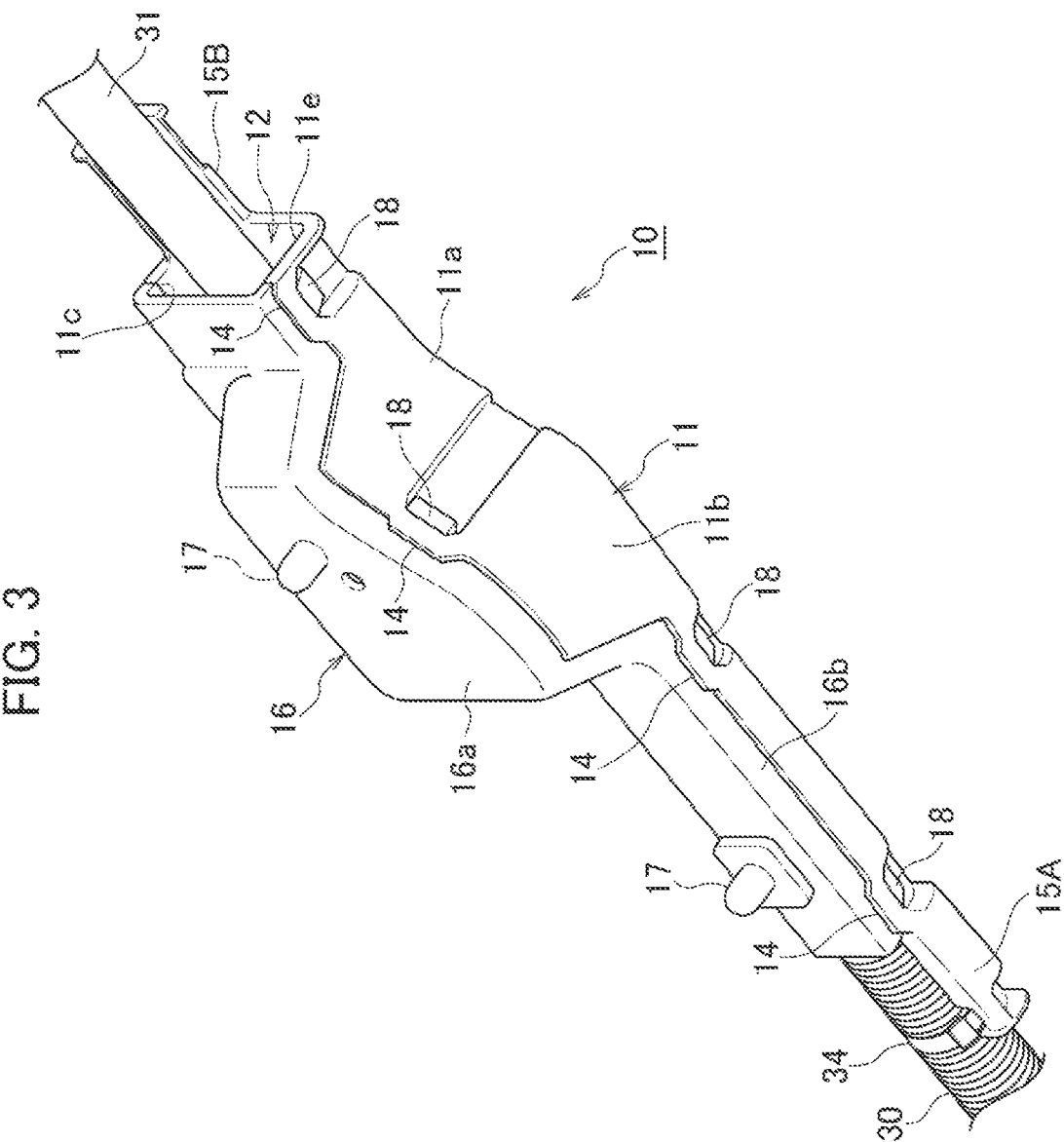
FIG. 3 is a perspective view of the protector.
Figure 4A:
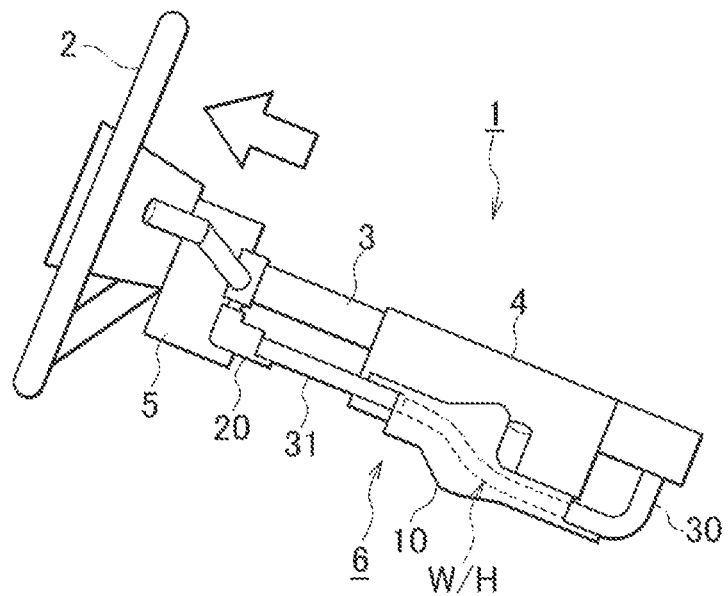
FIG. 4A is a side view illustrating a state where a steering wheel of the steering apparatus is located at a position on a vehicle rear side.
Figure 4B:
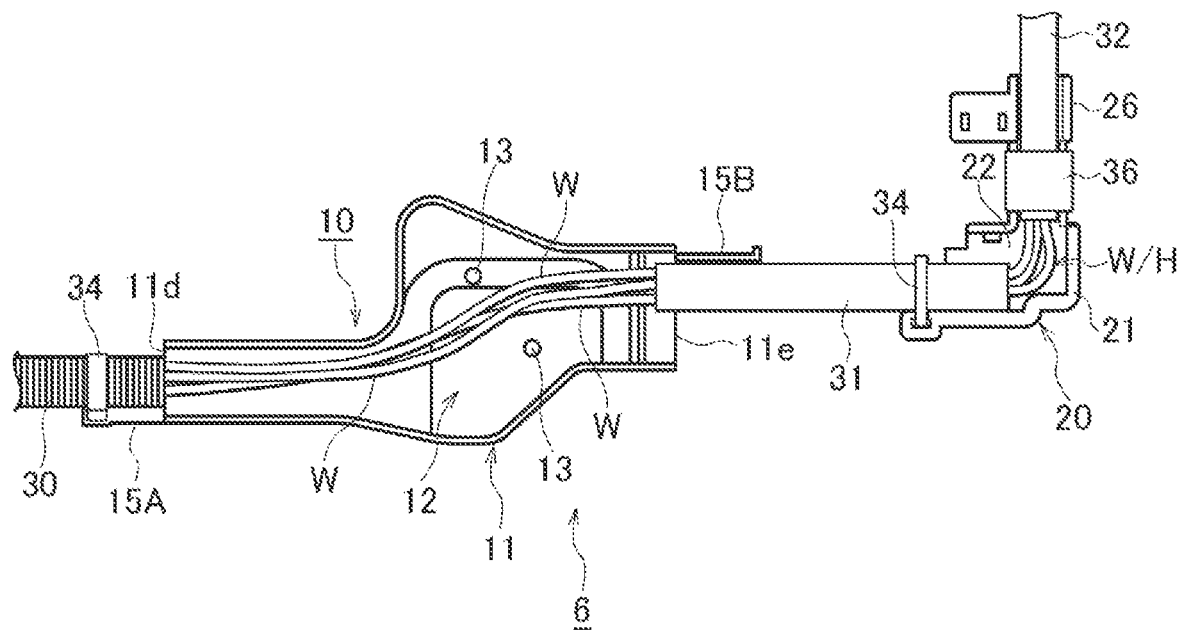
FIG. 4B is a plan view illustrating an accommodation mode of the wire harness in the protector when the steering wheel is located at the position on the vehicle rear side.
Figure 5A:
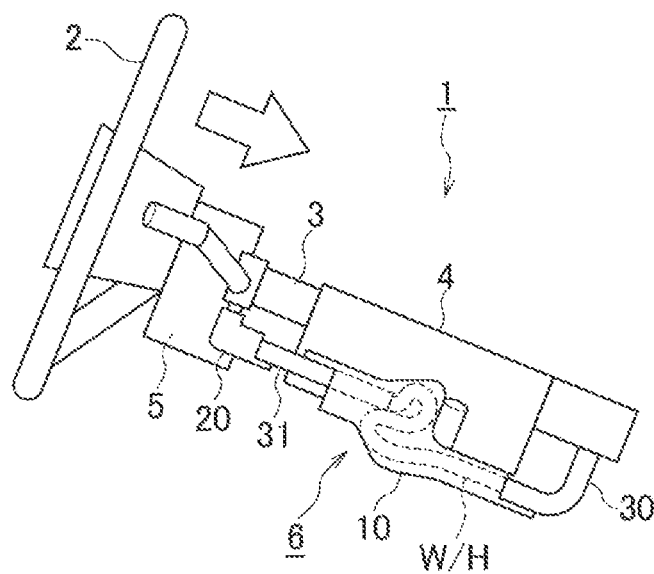
FIG. 5A is a side view illustrating a state where the steering wheel is located at a position on a vehicle front side.
Figure 5B:
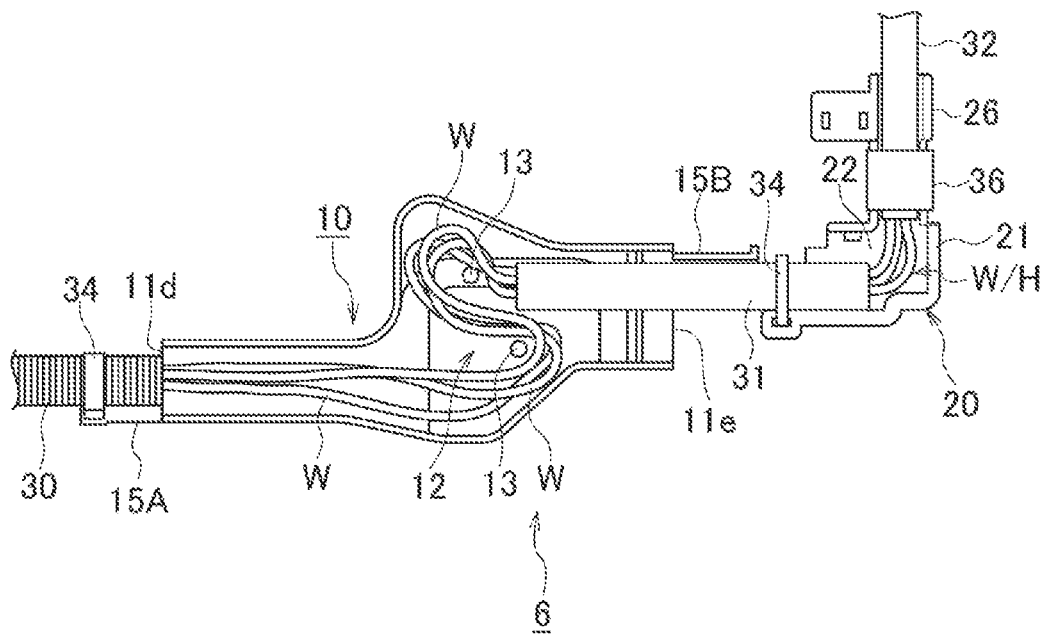
FIG. 5B is a plan view illustrating an accommodation mode of the wire harness in the protector when the steering wheel is located at the position on the vehicle front side.
Figure 6:
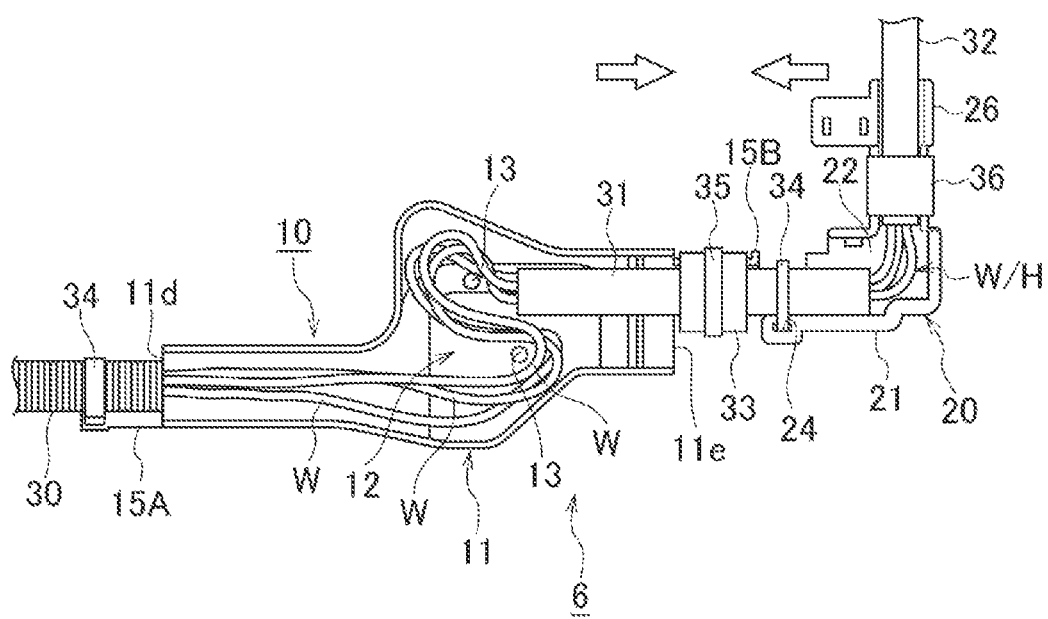
FIG. 6 is a plan view illustrating an accommodation mode of the wire harness in the protector when a wire harness assembly including the wire harness and the protector is conveyed.

FIG. 1 is a side view illustrating an example of a steering apparatus 1 according to an embodiment of the present invention. FIG. 2 is a plan view illustrating an accommodation mode of a wire harness W/H in a protector 10 used in the steering apparatus 1. FIG. 3 is a perspective view of the protector 10. FIG. 4A is a side view illustrating a state where a steering wheel 2 of the steering apparatus 1 is located at a position on a vehicle rear side. FIG. 4B is a plan view illustrating an accommodation mode of the wire harness W/H in the protector 10 when the steering wheel 2 is located at the position on the vehicle rear side. FIG. 5A is a side view illustrating a state where the steering wheel 2 is located at a position on a vehicle front side. FIG. 5B is a plan view illustrating an accommodation mode of the wire harness W/H in the protector 10 when the steering wheel 2 is located at the position on the vehicle front side. FIG. 6 is a plan view illustrating an accommodation mode of the wire harness W/H in the protector 10 when a wire harness assembly 6 including the wire harness W/H and the protector 10 is conveyed.

As illustrated in FIG. 1, the steering apparatus 1 includes the steering wheel 2, a steering shaft 3, a steering shaft cover 4, a combination switch steering column 5, and the wire harness assembly 6. As illustrated in FIG. 2, the wire harness assembly 6 is routed along the steering shaft 3 and includes the wire harness W/H including a plurality of electric wires W, a first protector (protector) 10, and a second protector 20.

The steering apparatus 1 according to the embodiment illustrated in FIG. 1 is mounted in a vehicle and has a telescopic function capable of adjusting a position of the steering wheel 2 in a vehicle front-rear direction. As illustrated in FIG. 1, the steering shaft 3 extending to the vehicle front side is connected to a center of the steering wheel 2. The steering shaft 3 is covered with the steering shaft cover 4 and is slidable (movable) in the steering shaft cover 4. The combination switch steering column 5 is connected to the steering wheel 2. The first protector 10 into which a part of the wire harness W/H positioned on the vehicle front side is inserted is attached to the steering shaft cover 4. The second protector 20 into which a part of the wire harness W/H on the steering wheel 2 side (vehicle rear side) is inserted is attached to the combination switch steering column 5. An end portion of the wire harness W/H on the steering wheel 2 side is connected to the combination switch steering column 5.

As illustrated in FIG. 2, the first protector 10 accommodates and protects a part of the wire harness W/H positioned on the vehicle front side. As illustrated in FIGS. 2 and 3, the first protector 10 includes a protector main body 11 and a cover 16 which is attached to the protector main body 11 and covers an upper surface opening 11c thereof. The protector main body 11 is made of a synthetic resin and includes a bottom wall 11a and a pair of side walls 11b extending from both sides of the bottom wall 11a, respectively. Between the bottom wall 11a and the pair of side walls 11b, an electric wire insertion space 12 into which the plurality of unbundled and scattered electric wires W of the wire harness W/H are inserted is formed. The electric wire insertion space 12 is an accommodation space that accommodates the plurality of unbundled and scattered electric wires W and is also an extra length accommodatable space that accommodates an extra length of the plurality of electric wires W in association with the movement of the steering wheel 2. In general, the wire harness W/H is configured of the plurality of electric wires W, and the plurality of electric wires W are bundled by tape winding or the like. However, the wire harness W/H positioned on the vehicle front side in the first protector 10 is accommodated in a state where the plurality of electric wires W are unbundled and scattered. The wire harness W/H positioned on the vehicle rear side in the second protector 20 is also accommodated in a state where the plurality of electric wires W are unbundled and scattered, but the wire harness W/H may be accommodated in a state where the plurality of electric wires W are bundled by tape winding or the like.

As illustrated in FIG. 2, the bottom wall 11a of the protector main body 11 has a pair of support through-holes 13 which allows a pair of supports 9a of an electric wire receiving table 9 to penetrate when the plurality of unbundled and scattered electric wires W in the electric wire insertion space 12 are routed. A section of the bottom wall 11a having the pair of support through-holes 13 is formed in a trapezoidal shape wider than a width of the electric wire lead-out portion 11d of the protector main body 11 on the vehicle front side and a width of the electric wire lead-out portion 11e of the protector main body 11 on the vehicle rear side, and the section is formed in an S shape as viewed in a plan view. When the wire harness assembly 6 is assembled, the plurality of unbundled and scattered electric wires W are routed in an S shape via the pair of supports 9a in the electric wire insertion space 12. With this routing, as illustrated in FIG. 4B, in a state where the steering wheel 2 moves to the vehicle rear side and is located at a movable limit position (first movable limit position) on the vehicle rear side, the plurality of unbundled and scattered electric wires W in the electric wire insertion space 12 of the first protector 10 are gently curved in an S shape. As illustrated in FIG. 5B, in a state where the steering wheel 2 moves to the vehicle front side and is located at a movable limit position (second movable limit position) on the vehicle front side, the plurality of unbundled and scattered electric wires W in the electric wire insertion space 12 of the first protector 10 are gently curved in an S shape. The electric wire receiving table 9 of a harness manufacturing jig in which the pair of supports 9a are provided receives the protector main body 11 and is used when the wire harness assembly 6 is assembled.

As illustrated in FIGS. 2 and 3, the electric wire lead-out portion 11d has a projecting piece 15A. The wire harness W/H positioned on the vehicle front side is inserted into and accommodated in a corrugated tube (cylindrical protection member) 30. The corrugated tube 30 is fixed to the projecting piece 15A on the front side via a binding band 34. The electric wire lead-out portion 11e has a projecting piece 15B on the rear side. The wire harness W/H positioned on the vehicle rear side is inserted into and accommodated in a vinyl tube (cylindrical protection member) 31. The vinyl tube 31 abuts on the projecting piece 15B on the rear side. As illustrated in FIG. 6, the projecting piece 15B on the rear side and the vinyl tube 31 may be fixed to each other with a rubber band (binding band) 35 after the vinyl tube 31 is abutted on the projecting piece 15B on the rear side and outer circumferences of the projecting piece 15B on the rear side and the vinyl tube 31 are covered with a foamed urethane sheet (cushion sheet) 33.

As illustrated in FIG. 3, the cover 16 is made of a synthetic resin and includes a ceiling wall 16a having a stepped shape and a pair of side walls 16b extending from both sides of the ceiling wall 16a. A pair of fixing protrusions (locking portions) 17 is provided on both end sides of the ceiling wall 16a. The first protector 10 is attached to the steering shaft cover 4 via the pair of fixing protrusions 17. On both end sides and the center of the pair of side walls 16b, locking claws 18 locked to respective frame-shaped engaging portions 14 protruding from both end sides and the center of the pair of side walls 11b of the protector main body 11 are provided in a protruding manner.

As illustrated in FIG. 2, the second protector 20 includes an L-shaped protector main body 21 which has a quadrangular cylinder shape and is made of a synthetic resin. An electric wire insertion space 22 is provided inside the protector main body 21. The protector main body 21 is attached to the combination switch steering column 5 by fixing means (not illustrated).

The electric wire lead-out portion 23 of the protector main body 21 of the second protector 20 on the vehicle front side has a fixing hole 24. The vinyl tube 31 abutted on the projecting piece 15B on the rear side of the first protector 10 is fixed to the electric wire lead-out portion 23 side of the second protector 20 on the vehicle front side via the binding band 34 inserted into the fixing hole 24. A electric wire lead-out portion 25 on the vehicle rear side of the protector main body 21 has a projecting piece 26. A part of the wire harness W/H positioned on the vehicle rear side is inserted into and accommodated in a vinyl tube (cylindrical protection member) 32. The vinyl tube 32 is fixed to the projecting piece 26 via an adhesive tape 36.

The wire harness W/H is configured of the plurality of electric wires W, and at least a part of the wire harness positioned between the first protector 10 and the second protector 20 is accommodated in each of the protectors 10 and 20 in a state where the plurality of electric wires W are scattered and unbundled with tape winding or the like. Connectors (not illustrated) are connected to both terminals of the wire harness W/H. The plurality of electric wires W constituting the wire harness W/H are partially covered with the corrugated tube 30, the vinyl tube 31, and the vinyl tube 32 from the vehicle front side to the vehicle rear side. The plurality of electric wires W constituting the wire harness W/H covered with the tubes 30 to 32 are inserted into the electric wire insertion spaces 12 and 22 of the first protector 10 and the second protector 20. Accordingly, the corrugated tube 30 is fixed to the first protector 10 on the vehicle front side with the binding band 34. The vinyl tube 31 is fixed to the second protector 20 on the vehicle front with the binding band 34. The vinyl tube 32 is fixed to the second protector 20 on the vehicle rear side with an adhesive tape 36. In this manner, the wire harness assembly 6 is assembled. In an assembled state of the wire harness assembly 6, an end portion of the vinyl tube 31 on the vehicle front side is positioned in the electric wire insertion space 12 of the first protector 10. Further, the plurality of unbundled and scattered electric wires W constituting the wire harness W/H are accommodated in the electric wire insertion space 12 of the first protector 10. Since the plurality of electric wires W are routed in an S shape by the pair of supports 9a of the electric wire receiving table 9 of the harness manufacturing jig, the plurality of electric wires W are curved into the S shape.

In the steering apparatus 1 according to the embodiment, a state where the steering wheel 2 is moved in the vehicle front-rear direction and a state of the plurality of electric wires W in which a part of the wire harnesses W/H in the electric wire insertion space 12 of the first protector 10 is unbundled and scattered will be described.

FIG. 1 illustrates a state where the steering wheel 2 has moved in the steering shaft cover 4 and is in an intermediate position. As illustrated in FIG. 2, in the electric wire insertion space 12 of the first protector 10, the plurality of unbundled and scattered electric wires W are curved into an S shape.

FIG. 4A illustrates a state where the steering wheel 2 moves to the vehicle rear side and is located at the movable limit position on the vehicle rear side. As illustrated in FIG. 4B, in the electric wire insertion space 12 of the first protector 10, the plurality of unbundled and scattered electric wires W are gently curved in an S-shape as compared with the state where the steering wheel 2 is at the intermediate position.

FIG. 5A illustrates a state where the steering wheel 2 moves to the vehicle front side and is located at the movable limit position on the vehicle front side. As illustrated in FIG. 5B, in the electric wire insertion space 12 of the first protector 10, the plurality of unbundled and scattered electric wires W are more curved in an S-shape as compared with the state where the steering wheel 2 is at the intermediate position.

As described above, in the steering apparatus 1 according to the embodiment, when the steering wheel 2 is moved toward the movable limit position on the vehicle front side, a force for moving the steering wheel 2 and a force for more curving the plurality of scattered electric wires W are required. However, the force of curving the plurality of scattered electric wires W is smaller than that of the related art in which the plurality of electric wires are bundled with tape winding or the like. Consequently, it is possible to improve the moving operability of the steering wheel 2 when the steering wheel 2 is moved toward the movable limit position on the vehicle front side.

In an aspect illustrated in FIG. 6, the outer circumference of the vinyl tube 31 into which the wire harness W/H is inserted is covered with the urethane foam sheet 33 and then fixed to the projecting piece 15B of the first protector 10 on the rear side with the rubber band 35. Therefore, when the wire harness assembly 6 is conveyed, the wire harness assembly 6 can be conveyed in a compact state. In addition, when the wire harness assembly 6 is put in a case or the like and conveyed, the work of putting the wire harness assembly 6 in the case or the like can be easily performed.

In the above-described embodiment, the wire harness W/H in which the plurality of electric wires W are scattered is used between the first protector 10 and the second protector 20, but the wire harness W/H in which the plurality of electric wires W are bundled with tape winding or the like may be used other than in the first protector 10.

According to the above-described embodiment, the projecting piece 15A for fixing the cylindrical protection member such as the corrugated tube 30 is provided on the protector main body 11 side of the first protector 10, but the projecting piece may be provided on the cover 16 side of the first protector 10.

According to the above-described embodiment, the corrugated tube 30 and the vinyl tubes 31 and 32 as the cylindrical protection members into which the wire harness W/H is inserted and protected are arranged in sequential order from the vehicle front side, but the arranged positions and combination thereof may be appropriately changed.

Some embodiments of the present invention are described; however, the embodiments are provided as examples and are not intentionally provided to limit the scope to the invention. The novel embodiments can be realized in various other embodiments, and various omissions, replacements, or modifications can be performed within a range without departing from the gist of the invention. The embodiments or modifications thereof are included in the scope or the gist of the invention and are included in the invention and the scope equivalent to the invention described in claims.

What is claimed is:

1. A steering apparatus comprising:
   a steering shaft coupled to a center of a steering wheel and movable in a front-rear direction of a vehicle;
   a steering shaft cover covering the steering shaft and allowing the steering shaft to be movable therein; and
   a protector attached to the steering shaft cover and allowing a part of a wire harness to be inserted and accommodated therein, the wire harness being a plurality of electric wires bundled and routed along the steering shaft,
   wherein the wire harness positioned in the protector is routed in a state where the plurality of electric wires are unbundled and scattered.

2. The steering apparatus according to claim 1, wherein the protector includes:
   a protector main body; and
   a cover attached to the protector main body and covering an upper surface opening of the protector main body,
   the cover includes at least a pair of locking portions, and
   the protector is attached to the steering shaft cover via at least the pair of locking portions.

3. The steering apparatus according to claim 2, wherein the protector main body includes:
   a bottom wall; and
   a pair of side wall extending from both sides of the bottom wall, respectively,
   an electric wire insertion space as an electric wire accommodation space in which the plurality of electric wires in the state of being unbundled and scattered are accommodated is formed between the bottom wall and the pair of side wall,
   the bottom wall has a pair of support through-holes allowing a pair of supports of an electric wire receiving table to penetrate therethrough when the plurality of electric wires in the state of being unbundled and scattered are routed in the electric wire insertion space, and the plurality of electric wires in the state of being unbundled and scattered are routed in an S shape via the pair of supports in the electric wire insertion space.

4. The steering apparatus according to claim 2, further comprising:
a projecting piece provided at an electric wire lead-out portion of the protector main body on a vehicle rear side; and
a cylindrical protection member accommodating a part of the wire harness positioned on the vehicle rear side, wherein the projecting piece and the cylindrical protection member are fixed to each other via a cushion sheet and a binding band.

5. The steering apparatus according to claim 3, wherein
in a state where the steering wheel has moved to a vehicle rear side and is located at a first movable limit position on the vehicle rear side, the plurality of electric wires in the state of being unbundled and scattered are gently curved in an S-shape in the electric wire insertion space, and
in a state where the steering wheel has moved to a vehicle front side and is located at a second movable limit position on the vehicle front side, the plurality of electric wires in the state of being unbundled and scattered are more curved in an S-shape than in the first movable limit position in the electric wire insertion space.

* * * * *